(12) United States Patent
Greif

(10) Patent No.: US 6,651,913 B1
(45) Date of Patent: Nov. 25, 2003

(54) ELECTROMAGNETIC INJECTION VALVE FOR CONTROLLING A FUEL AMOUNT TO BE INJECTED INTO AN INTERNAL COMBUSTION ENGINE

(75) Inventor: Hubert Greif, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 09/958,246

(22) PCT Filed: Jan. 5, 2001

(86) PCT No.: PCT/DE01/00015
§ 371 (c)(1),
(2), (4) Date: Jan. 7, 2002

(87) PCT Pub. No.: WO01/57389
PCT Pub. Date: Aug. 9, 2001

(30) Foreign Application Priority Data

Feb. 5, 2000 (DE) .......................................... 100 05 182

(51) Int. Cl.⁷ ................................................ B05B 1/30
(52) U.S. Cl. ............................... 239/585.1; 239/585.2; 239/585.3; 239/585.4; 239/585.5; 251/129.1; 335/180; 335/220
(58) Field of Search .......................... 239/585.1, 585.2, 239/585.3, 585.4, 585.5; 251/129.09, 129.1; 335/180, 181, 220, 243, 246, 256, 266

(56) References Cited

U.S. PATENT DOCUMENTS

| | | | | | |
|---|---|---|---|---|---|
| 4,156,506 | A | * | 5/1979 | Locke et al. | 239/585.3 |
| 4,664,355 | A | * | 5/1987 | Kubach | 251/129.09 |
| 4,673,163 | A | * | 6/1987 | Kushida et al. | 251/129.1 |
| 4,716,393 | A | * | 12/1987 | Logie | 335/266 |
| 4,813,599 | A | * | 3/1989 | Greiner et al. | 239/585.3 |
| 5,441,232 | A | * | 8/1995 | Tanaka | 251/129.1 |

FOREIGN PATENT DOCUMENTS

| | | | | |
|---|---|---|---|---|
| DE | 3241521 A1 | * | 5/1984 | H01F/7/18 |
| FR | 2031027 A | * | 11/1970 | |

* cited by examiner

Primary Examiner—Robin O. Evans
(74) Attorney, Agent, or Firm—Kenyon & Kenyon

(57) ABSTRACT

An electromagnetic injector for controlling a fuel quantity to be fed into an internal combustion engine includes a valve body displaceable by an electromagnetic coil system, the valve body acting together with a magnet armature of the electromagnetic coil system. The electromagnetic coil system includes at least two concentrically positioned coils integrated into the magnetic circuit so that in each case a first pole body is positioned between two adjacent coils, and the inner and outer coil are respectively adjacent to a second pole body, the first and second pole bodies are components of the magnetic circuit of the electromagnetic coil system, and in each case adjacent coils may have a common field current flowing through them in opposite directional sense to each other.

5 Claims, 4 Drawing Sheets

ELECTROMAGNETIC INJECTION VALVE FOR CONTROLLING A FUEL AMOUNT TO BE INJECTED INTO AN INTERNAL COMBUSTION ENGINE

FIELD OF THE INVENTION

The present invention relates to an electromagnetic injector for controlling the fuel quantity to be fed into an internal combustion engine.

BACKGROUND INFORMATION

Electromagnetic injectors are conventionally used in present-day gasoline and Diesel fuel injection systems. The conventional electromagnetic injectors use single-coil concepts. In this connection, a magnetic field is built up by having one coil traversed by current flow, thereby generating a magnetic flux in the surrounding magnetic circuit. A valve body is moved by the magnetic flux acting upon a movable magnet armature connected to the valve body via an air space. The opening duration of the electromagnetic injector and, thus, the injection quantity are controlled by varying the duration of current flow traversing the coil.

In principle, the buildup of magnetic flux in a magnetic circuit of a coil does not occur instantaneously in response to current flowing in the coil but occurs with a certain time delay. The time delay of the build-up of the field depends on many factors, such as the geometry of the magnetic circuit, and especially on field diffusion and the eddy currents, thus produced. Eddy currents are electrical currents induced in massive, electrically conductive bodies by a temporally variable magnetic field, such as during the buildup of the magnetic field. In the process, the eddy currents counteract a rapid field diffusion.

The time delay between current flow in the coil and field buildup leads to an undesired increase in the response time of electromagnetic injectors. Response times of 100 μs or less, which are required in modern injection systems, are currently made possible only by higher voltages made possible with the aid of booster capacitors, or by costly switched double coil systems with mutually canceling force effect. The disadvantage with these conventional systems is the high constructive effort required for the electrical circuits, which goes along with high costs and great space requirements.

SUMMARY

The electromagnetic injector according to the present invention offers the advantage of a short response time and low circuit cost. To accomplish this, the injector according to the present invention includes an electromagnetic coil system having at least two concentrically arranged coils, the coils being integrated into a magnetic circuit so that between two adjacent coils a first pole body is positioned in each case, and an inner and outer coil is in each case adjacent to a second pole body, the first and second pole bodies being components of the magnetic circuit of the electromagnetic coil system, and in each case adjacent coils having a common field current flow through them in directions opposite to each other. In such a multi-coil system, because of letting current flow in the coils in the opposite direction, in the inner-lying first pole body a mutually opposite field direction of the generated eddy currents occurs, and thus the eddy currents are extinguished. As a result, the field diffusion and thus the force buildup of the magnetic circuit occur considerably faster than in a conventional one-coil system. In addition, in the first pole body between two coils, the magnetic field is constructively magnified, since at this point the two magnetic fields overlap codirectionally, and thus a greater magnetic flux is generated.

According to one example embodiment of the injector according to the present invention, the pole bodies are dimensioned so that a radial cut surface of a middle first pole body is substantially equal to the sum of the cut surfaces of the two adjacent pole bodies. In the case of a geometry of a magnetic circuit selected in this manner, the mutual cancellation of actions of force of two adjacent coils is prevented.

The coils may have approximately identical characteristics, especially equal inductivity.

The coils may be arranged in a parallel circuit.

Advantageous further developments of the present invention result from the measures indicated in the dependent claims.

DETAILED DESCRIPTION

Figure 1:
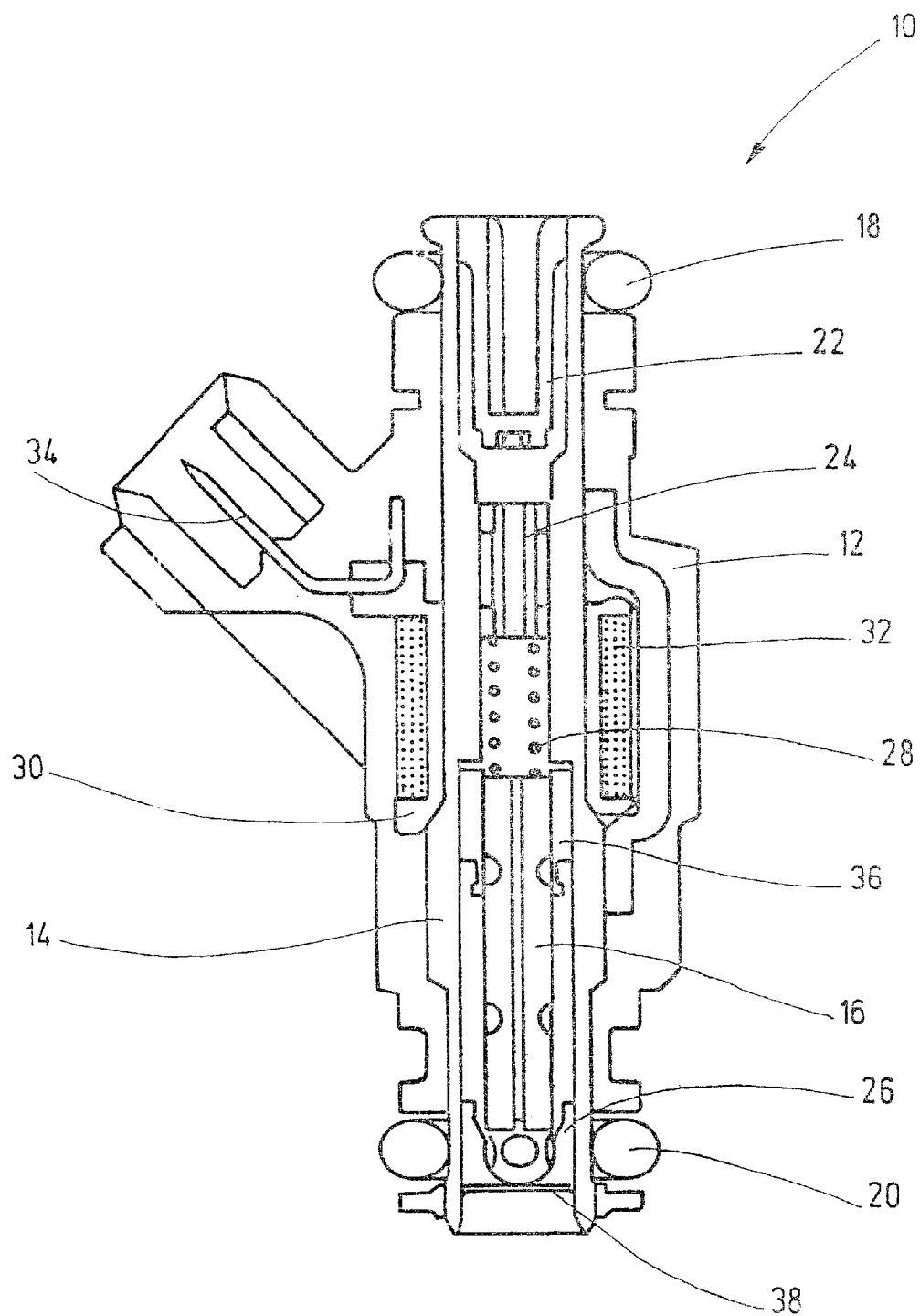
FIG. 1 is a cross-sectional view of an electromagnetic injector.

FIG. 1 is a cross-sectional view of an electromagnetic injector. The injector denoted overall by 10 includes a valve housing 12, a valve core 14 and an axially movable valve needle 16. Two O-rings 18, 20 seal the injector 10 from a fuel distributor piece and a suction manifold. Fuel entering from above in FIG. 1 flows first through a fuel screen 22, which protects injector 10 from contamination. The fuel continues via a fluidic device 24, to reach a cavity in valve needle 16, from where it arrives at valve seat 26 through lateral apertures in valve needle 16. In a base state of injector 10, a spring 28 and the force resulting from the fuel pressure press on valve seat 26 and seal the fuel supply system from the suction manifold.

The electromagnetic injector 10 further includes a coil 32 wound on a coil form 30, to which a field current may be applied via an electrical terminal 34. When current is allowed to flow in coil 32, a magnetic field is generated in the magnetic circuit surrounding the coil, by which a magnet armature is attracted. As a result, valve needle 16, connected by force-locking to magnet armature 36, lifts off valve seat 26, so that fuel exits through a spray-orifice plate 38 into the suction manifold. When the field current is switched off, valve needle 16 is restored by spring 28, so that valve 10 closes.

Figure 2:
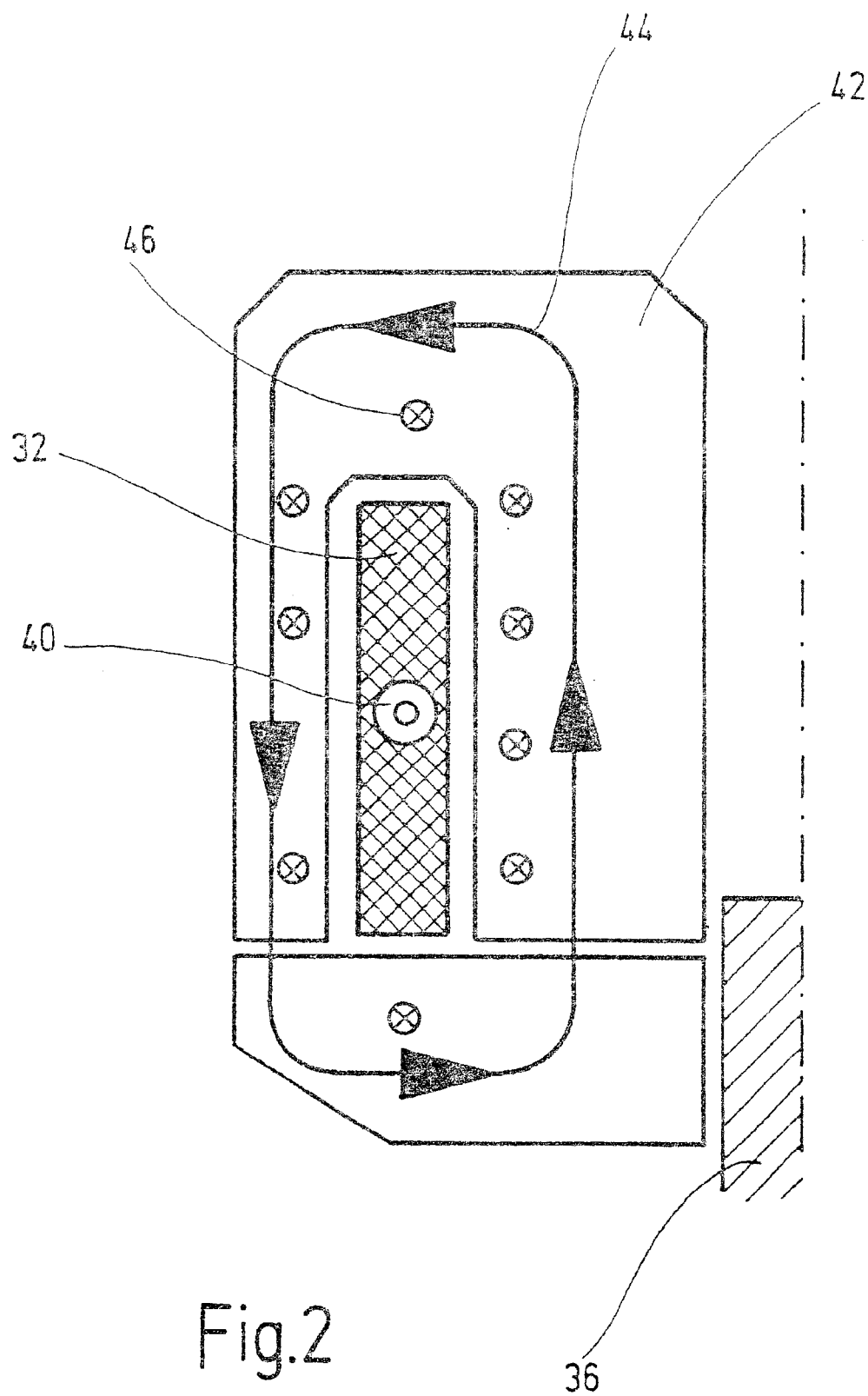
FIG. 2 is a schematic view of a magnetic circuit in a single coil system.

The buildup of a magnetic field in a conventional injector having a single-coil system is illustrated schematically in FIG. 2. If a coil 32, of which only one side is illustrated in cross-sectional view, has field current 40 applied to it, a magnetic field 44 builds up in a pole body 42 surrounding coil 32. According to the law of induction, as a result of the buildup of the magnetic field, $$rot\ E = -\frac{\delta}{\delta t}B,$$

wherein B is the magnetic flux density, an eddy current rot E 46 is generated in pole body 42. The main current direction of eddy current 46 is opposite to the direction of field current 40 of coil 32. The formation of eddy current 46 reduces the diffusion rate of magnetic field 44 and thus the buildup rate of the force acting on armature 36. The consequence is a prolonged response time or dead time of electromagnetic injector 10.

Figure 3:
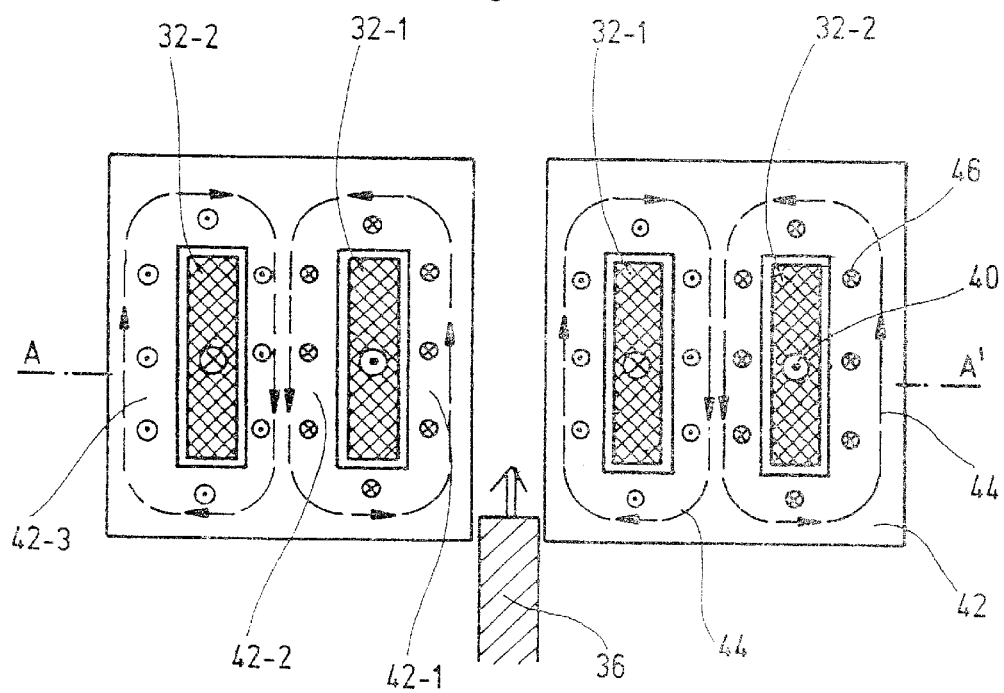
FIG. 3 is a schematic view of a magnetic circuit in a two coil system according to the present invention.
Figure 3:
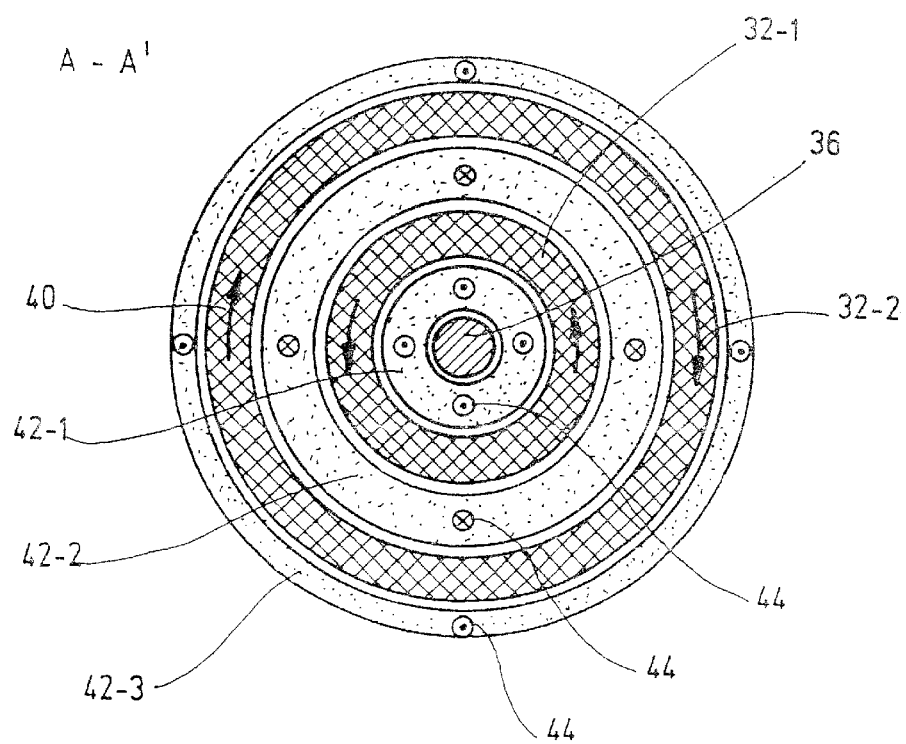

In order to overcome the problem of the delayed field and force buildups in conventional injectors, two or more concentrically arranged coils are installed according to the present invention. FIG. 3 schematically illustrates the magnetic field of an electromagnetic coil system, having an inside lying coil 32-1 and an outside lying coil 32-2. In the lower part of FIG. 3, a radial cross-sectional view of the double coil magnetic circuit is illustrated along axis A–A'. In the two coils 32-1 and 32-2, field current 40 is allowed to flow in directions opposite to each other. Each coil 32-1, 32-2 is enclosed on both coil sides by a pole body 42. Letting current flow in coils 32-1, 32-2 leads to the buildup of a magnetic field 44 around each coil in surrounding pole body 42. Because of the opposing current directions of field current 40 of the two coils 32-1, 32-2, the two magnetic fields 44 of coils 32-1, 32-2 overlap codirectionally in central pole body 42-2. This brings about a strengthening of the field and thus a greater magnetic flux. The eddy currents 46 induced by magnetic fields 44 have current directions opposite to each other in inside lying pole body 42-2. Therefore, in this region extinguishing of eddy currents 46 and the generated eddy current field occurs. Therefore, in inside lying pole body 42-2 field diffusion may occur without eddy current losses, whereby magnetic field 44 may be built up significantly faster than is the case with the single coil system illustrated in FIG. 2. Thus, the response time of injector 10, from the time of having current traverse coils 32-1, 32-2 to the action of the magnetic force on armature 36 is shortened. A further reason for the accelerated force buildup in the double coil magnetic circuit is given by the field diffusion which may occur at four diameters or rather two diameters per applied coil 32.

When field current 40 is switched off, the same physical effects are useful. In the inside lying pole body 42-2, extinguishing of eddy currents 46 induced by the fading magnetic field 44 occurs, so that the field diffusion may occur considerably faster.

The advantageous effects of a multi-coil system according to the present invention are optimally utilized when the magnetic circuit is configured so that a radial pole surface of inside lying pole body 42-2 corresponds to the sum of the two adjacent pole surfaces of pole bodies 42-1 and 42-2 (cf. lower part of FIG. 3). This applies also if more than two coils make up the magnetic circuit.

Figure 4:
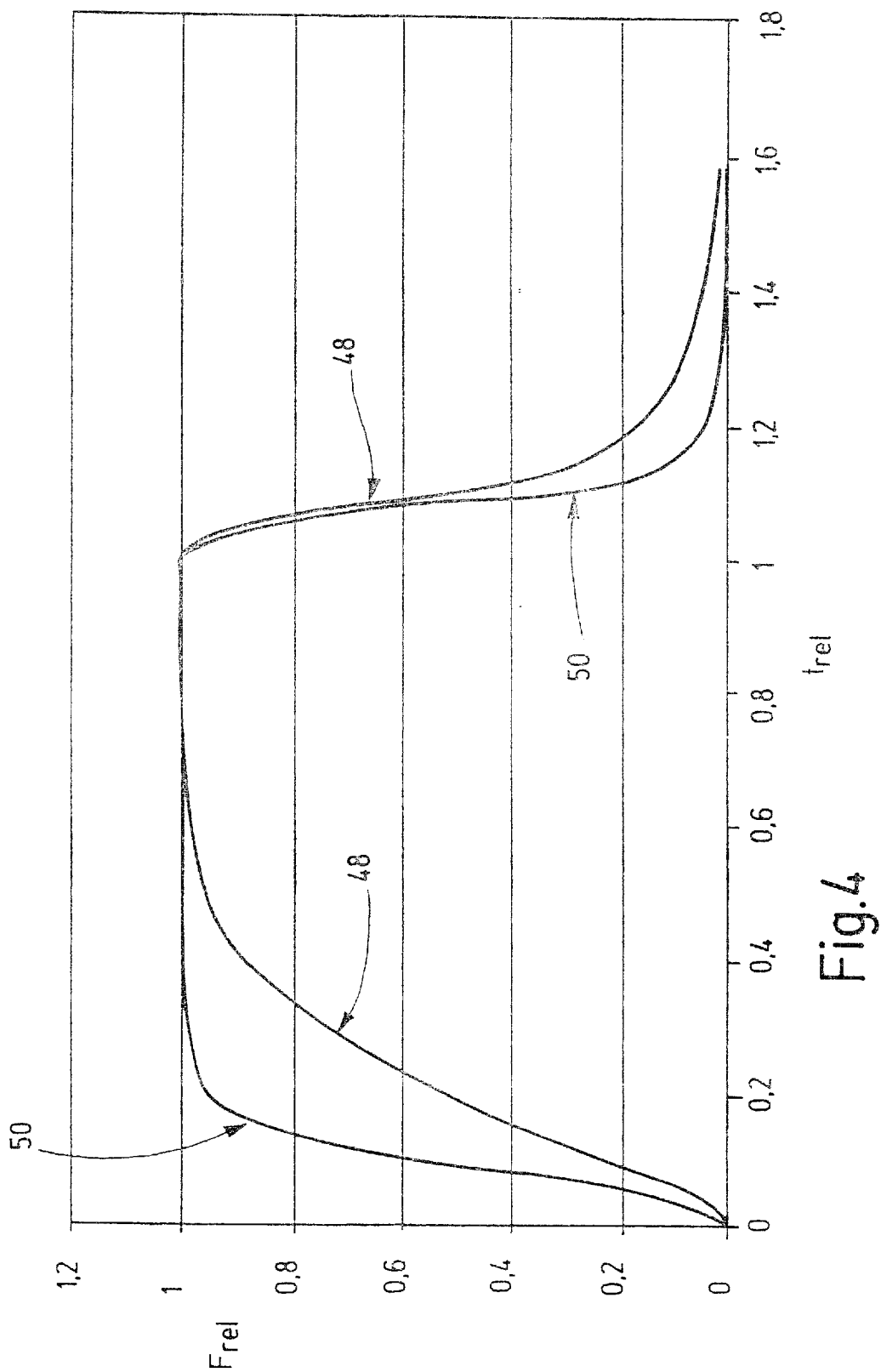
FIG. 4 is a graph illustrating force buildup in a single coil and a two coil magnetic circuit.

In FIG. 4, the rate of force buildup of a single-coil magnetic circuit and of the two-coil magnetic circuit according to the present invention is illustrated. For better comparability, relative force $F_{rel}$ is plotted as a function of a common relative time basis $t_{rel}$, where $t_{rel}=0$ is the point in time $t_0$ when current is allowed to flow in coil 32, and $t_{rel}=1$ is the point in time of switching off coil 32. In a conventional single-coil magnetic system, power buildup and fall have a comparatively flat curve (Graph 48). Thus, a relative magnetic force $F_{rel}$ of 0.8 is first reached after about 0.33 units of the common time base $t_{rel}$. The maximum magnetic force after having current traverse the two-coil system at time point $t_0$ is reached considerably faster (Graph 50), a magnetic force of 0.8 being already built up after about 0.12 time units. At switching-off of the coil at point in time $t_1$, also, a quicker force fall is achieved in the two-coil system (Graph 50).

An electromagnetic injector according to the present invention has a considerably shortened dead time when compared to conventional injectors, with extremely short startup and fall-off times. This also makes it possible to achieve a more precise preparation of small injection quantities. Because of its highly dynamic magnetic circuit, the injector according to the present invention is suited for use in modern gasoline and Diesel injection systems.

What is claimed is:

1. An electromagnetic injector for controlling a fuel quantity to be fed into an internal combustion engine, comprising:

an electromagnetic coil system including a magnet armature; and a valve body displaceable by the electromagnetic coil system and acting together with the magnet armature;

wherein the electromagnetic coil system includes at least two concentrically arranged coils, the coils being integrated in a magnetic circuit so that a first pole body is positioned between two adjacent coils, an inner coil being arranged adjacent to a second pole body, and an outer coil being arranged adjacent to a third pole body, the magnet circuit including the first pole body, the second pole body, and the third pole body; and wherein the adjacent coils are configured to have a common field current flowing therethrough in a mutually opposite directional sense.

2. The electromagnetic injector according to claim 1, wherein the pole bodies are dimensioned so that a radial sectional surface of a middle first pole body is substantially equal to a sum of sectional surfaces of the two adjacent pole bodies.

3. The electromagnetic injector according to claim 1, wherein the coils have substantially identical characteristics.

4. The electromagnetic injector according to claim 1, wherein the coils are connected in parallel.

5. The electromagnetic injector according to claim 1, wherein the valve body and the magnet armature are force-lock connected.

\* \* \* \* \*